(12) United States Patent
Miyazawa et al.

(10) Patent No.: US 8,633,910 B2
(45) Date of Patent: Jan. 21, 2014

(54) INFORMATION PROCESSING DEVICE, OPENING/CLOSING ANGLE DETECTING METHOD, AND OPENING/CLOSING ANGLE DETECTING PROGRAM

(75) Inventors: Yusuke Miyazawa, Tokyo (JP); Fuminori Homma, Tokyo (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 12/985,525

(22) Filed: Jan. 6, 2011

(65) Prior Publication Data

US 2011/0169754 A1 Jul. 14, 2011

(30) Foreign Application Priority Data

Jan. 14, 2010 (JP) ................. P2010-005998

(51) Int. Cl.
*G06F 3/041* (2006.01)
(52) U.S. Cl.
USPC ....... 345/173; 345/1.1; 345/174; 361/679.04; 361/679.06
(58) Field of Classification Search
USPC ............... 345/1.1, 1.2, 173–178; 361/679.04, 361/679.06–679.09, 679.15; 455/566
See application file for complete search history.

(56) References Cited

U.S. PATENT DOCUMENTS

| | | | |
|---|---|---|---|
| 7,428,142 B1 * | 9/2008 | Ligtenberg et al. | 361/679.55 |
| 8,259,080 B2 * | 9/2012 | Casparian et al. | 345/173 |
| 2004/0201545 A1 * | 10/2004 | Yamazaki et al. | 345/1.1 |
| 2007/0268264 A1 * | 11/2007 | Aarras et al. | 345/173 |
| 2010/0182265 A1 * | 7/2010 | Kim et al. | 345/173 |
| 2010/0298032 A1 * | 11/2010 | Lee et al. | 455/566 |

FOREIGN PATENT DOCUMENTS

JP 2004-158989 6/2004

* cited by examiner

*Primary Examiner* — Koosha Sharifi-Tafreshi
(74) *Attorney, Agent, or Firm* — Sherr & Jiang, PLLC

(57) ABSTRACT

An information processing device includes two casings that are openably/closably coupled to each other, a detection unit that is provided on at least one of the two casings and is configured to detect one of contact and proximity of an operation input with respect to an operation surface, and a control unit configured to extract a variation component, which varies along with proximity of the two casings in opening/closing of the two casings, based on a detection result, which is detected by the detection unit, and detect an opening/closing angle of the two casings based on the variation component.

16 Claims, 11 Drawing Sheets

FIG. 7A
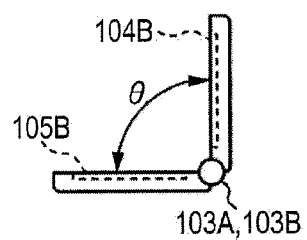
FIG. 7C
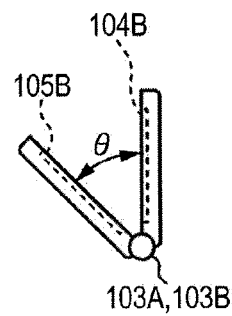
FIG. 7E
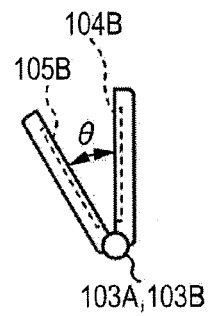
FIG. 7B
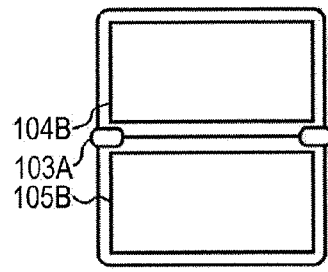
FIG. 7D
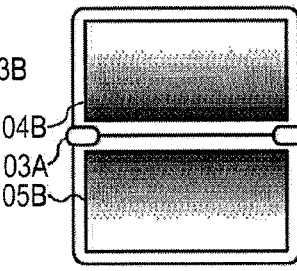
FIG. 7F
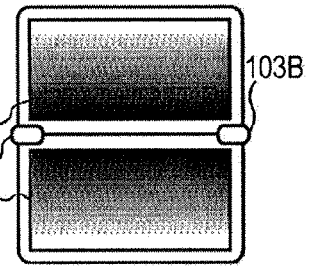

FIG. 11
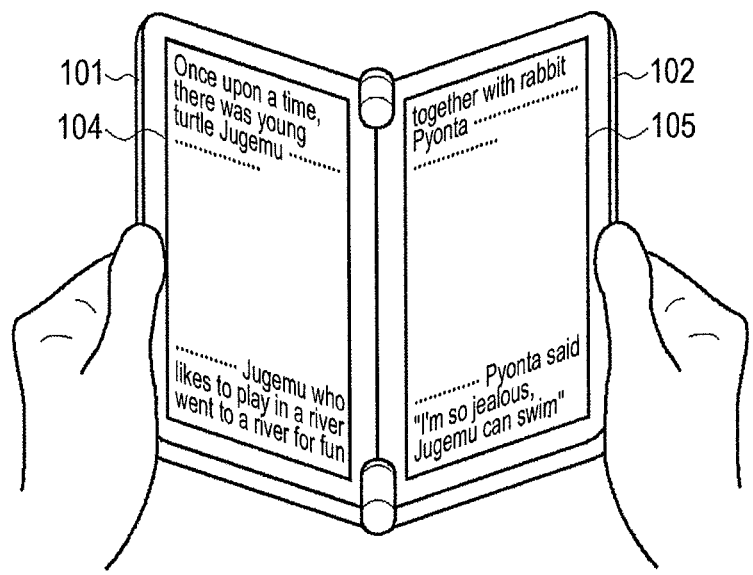
⇩ TILT CASING
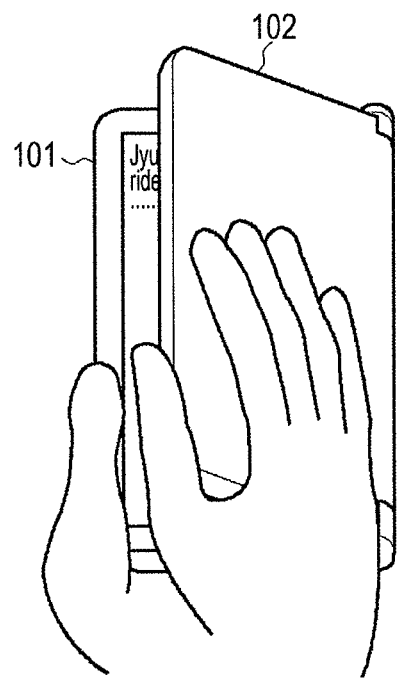

INFORMATION PROCESSING DEVICE, OPENING/CLOSING ANGLE DETECTING METHOD, AND OPENING/CLOSING ANGLE DETECTING PROGRAM

BACKGROUND OF THE INVENTION

1. Field of the Invention

The present invention relates to an information processing device, an opening/closing angle detecting method, and an opening/closing angle detecting program. The present invention is preferably applied for detecting an opening/closing angle of openable/closable casings of an information processing device, for example.

2. Description of the Related Art

In recent years, information processing devices, such as a notebook type personal computer and a portable telephone set, of which two casings are openably and closably coupled to each other with a hinge or the like have been widespread.

Among such type of information processing devices, an information processing device that detects an opening/closing angle of two casings and performs various processing based on the detection result is proposed.

For example, Japanese Unexamined Patent Application Publication No. 2004-158989 discloses a device that includes a rotary encoder provided at a hinge and detects an opening/closing angle of two casings based on a signal which is detected by the rotary encoder.

SUMMARY OF THE INVENTION

In the above-described information processing device, it is necessary to provide a dedicated sensor for detecting an opening/closing angle, such as a rotary encoder, so as to detect an opening/closing angle of two casings.

However, reduction of a size and a cost of an information processing device has been demanded in recent years, so that it is desirable to reduce the number of components of the information processing device.

It is preferable to provide an information processing device, an opening/closing angle detecting method, and an opening/closing angle detecting program that are capable of detecting an opening/closing angle of two casings with the simple configuration.

According to an embodiment of the present invention, there is provided an information processing device that includes two casings that are openably/closably coupled to each other, a detection unit that is provided on at least one of the two casings and is configured to detect one of contact and proximity of an operation input with respect to an operation surface, and a control unit configured to extract a variation component, which varies along with proximity of the two casings in opening/closing of the two casings, based on a detection result, which is detected by the detection unit, so as to detect an opening/closing angle of the two casings based on the variation component.

Thus, the information processing device according to the embodiment of the present invention extracts a variation component, which varies along with proximity of the two casings in opening/closing of the two casings, based on the detection result which is detected by the detection unit so as to accept an operation input, and detects an opening/closing angle of the two casings based on the variation component. Accordingly, the information processing device can detect the opening/closing angle of the two casings without a dedicated sensor.

According to the embodiment of the present invention, a variation component varying along with proximity of the two casings in opening/closing of the two casings is extracted based on the detection result which is detected by the detection unit so as to accept an operation input and an opening/closing angle of the two casings is detected based on the variation component. Accordingly, an opening/closing angle of the two casings can be detected without a dedicated sensor. Thus, an information processing device, an opening/closing angle detecting method, and an opening/closing angle detecting program that are capable of detecting an opening/closing angle of the two casings with the simple configuration can be realized.

BRIEF DESCRIPTION OF THE DRAWINGS

FIGS. 7A to 7F are diagrams used to describe variation of an output value of an electrostatic sensor in opening/closing;

FIG. 11 is a diagram used to describe an operation input for continuously flipping through pages.

DESCRIPTION OF THE PREFERRED EMBODIMENTS

Preferred embodiments (referred to below as embodiments) of the present invention will be described below in the following order.

1. Embodiment
2. Other Embodiment

<1. Embodiment>

[1-1. Outline of an Embodiment]

An outline of an embodiment is first described. A specific description of the embodiment follows the description of the outline.

Figure 1:
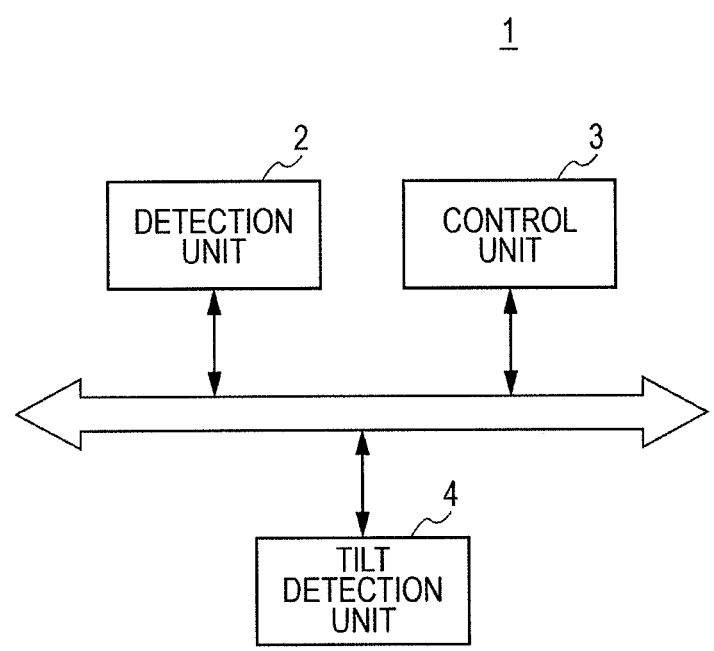
FIG. 1 is a block diagram schematically showing the functional configuration of an information processing device according to an embodiment of the present invention.

A reference numeral 1 in FIG. 1 indicates an information processing device. This information processing device 1 includes two casings (not shown) that are openably and closably coupled to each other.

Further, a detection unit 2 is provided for the information processing device 1. The detection unit 2 is provided on at least one of the two casings and detects contact or proximity of an operation input with respect to an operation surface.

Further, a control unit 3 is provided for the information processing device 1. The control unit 3 extracts a variation component, which varies along with proximity of the two casings in their opening/closing, based on the detection result detected by the detection unit 2, and detects an opening/closing angle of the two casings based on the variation component.

Thus, the information processing device 1 extracts a variation component, which varies along with proximity of the two casings in their opening/closing, based on a result which is detected by the detection unit 2 so as to accept an operation input, and detects an opening/closing angle of the two casings based on the variation component. Accordingly, the information processing device 1 can detect an opening/closing angle of the two casings without a dedicated sensor. Thus, the information processing device 1 can detect an opening/closing angle of the two casings with the simple configuration.

Specifically, the control unit 3 is configured to detect an opening/closing angle of the two casings based on a variation component at a position, which is closest to an opening/closing axis of the two casings, of an operation surface.

Further, the control unit 3 may detect an opening/closing angle of the two casings based on a variation component of a line, which is vertical to the opening/closing axis of the two casings, on the operation surface.

Furthermore, the control unit 3 may accept an operation input based on a detected opening/closing angle of the two casings.

Furthermore, the control unit 3 may display images on two displays (not shown) which are respectively provided on two casings and may switch images, which are displayed on the displays, based on variation of the opening/closing angle of the two casings.

The information processing device 1 may be further provided with a tilt detection unit 4 that detects a tilt of at least one of the two casings. In this case, the control unit 3 may display images on the two displays respectively provided on the two casings, and may continuously switch images, which are displayed on the displays, based on variation of the tilt when the opening/closing angle of the two casings is within a predetermined range.

A specific example of the information processing device 1 having such configuration is described in detail below.

[1-2. Appearance Configuration of Portable Terminal]

Figure 2:
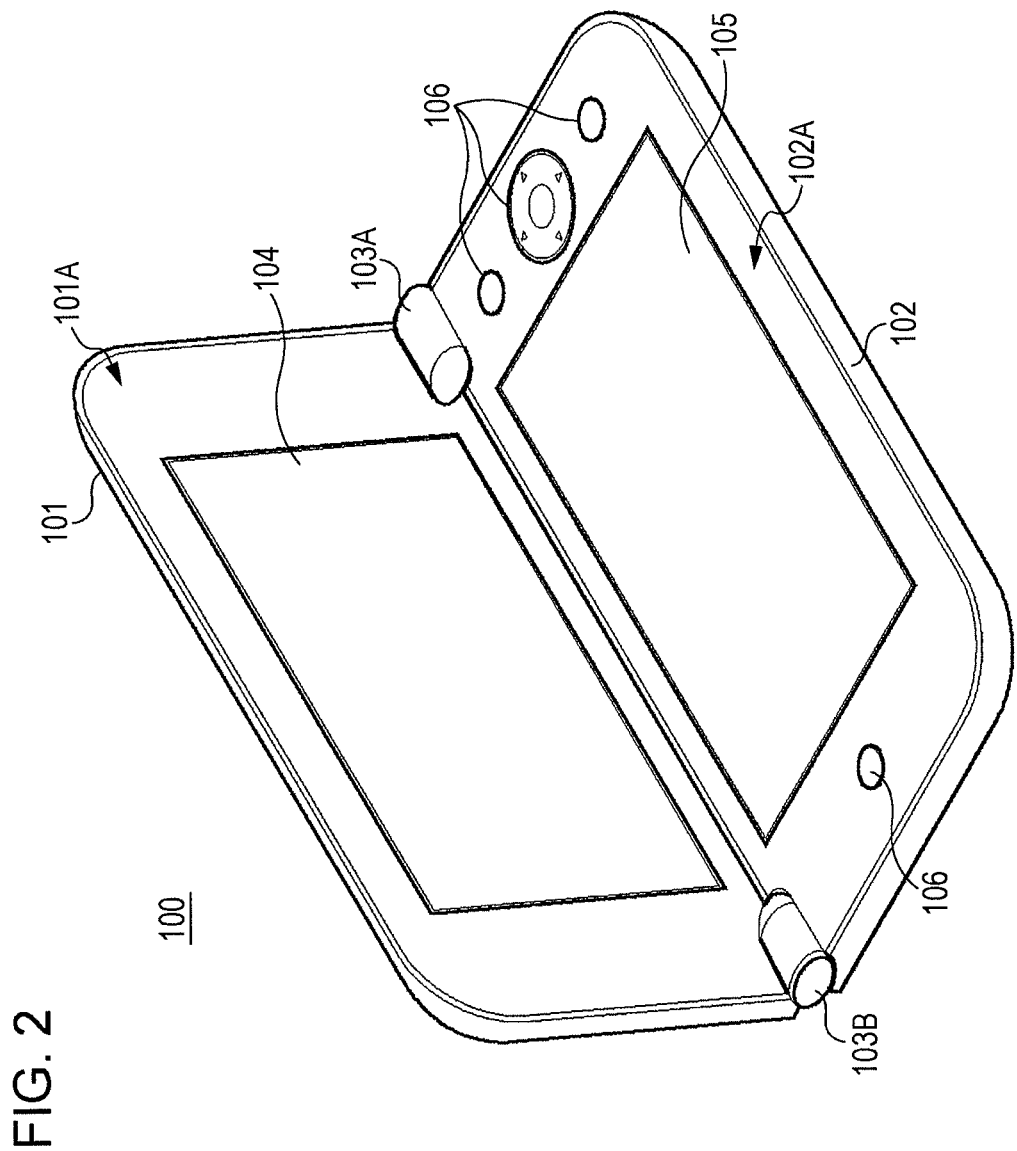
FIG. 2 is a schematic diagram showing the appearance configuration of a portable terminal.

The appearance configuration of a portable terminal 100 which is a specific example of the information processing device 1 described above is next described with reference to FIG. 2.

The portable terminal 100 includes a first casing 101 and a second casing 102 that respectively have sizes to be able to be held by one hand and are formed in an approximate flat-rectangular shape.

The first casing 101 and the second casing 102 are coupled to each other in an openable and closable manner with coupling units 103A and 103B that are hinges, for example, at their long sides.

At the center of a front surface 101A of the first casing 101, a first touch screen 104 having a rectangular shape is provided. At the center of a front surface 102A of the second casing 102 as well, a second touch screen 105 having the same shape and the same size as those of the first touch screen 104 is provided.

Each of the first touch screen 104 and the second touch screen 105 is composed of a liquid crystal panel and a thin-transparent touch panel that covers a display surface of the liquid crystal panel. The touch panel is a capacitance type touch panel and is compatible to the multi-touch.

The portable terminal 100 accepts a contact operation and a proximity operation by a finger (a touch pen or the like is also available) with respect to each of the first touch screen 104 and the second touch screen 105 as an operation input.

Here, the contact operation is an operation which is performed by touching the touch screen by a finger (this is called a touch operation as well), and the proximity operation is an operation which is performed by bringing a finger in proximity to the touch screen without touching the screen.

The portable terminal 100 is mainly used in a manner that the first casing 101 is positioned at the upper side and the second casing 102 is positioned at the lower side, that is, the portable terminal 100 usually displays various information on the screens in a manner that the first touch screen 104 serves as an upper screen and the second touch screen 105 serves as a lower screen.

On the front surface 102A of the second casing 102 of the portable terminal 100, various operation buttons 106 such as a power button are further provided at both sides of the second touch screen 105.

When the first casing 101 and the second casing 102 are opened/closed, the front surface 101A of the first casing 101 and the front surface 102A of the second casing 102 are opposed to each other. That is, when the first casing 101 and the second casing 102 are opened/closed, an operation surface of the first touch screen 104 and an operation surface of the second touch screen 105 are opposed to each other.

[1-3. Hardware Configuration of Portable Terminal]

Figure 3:
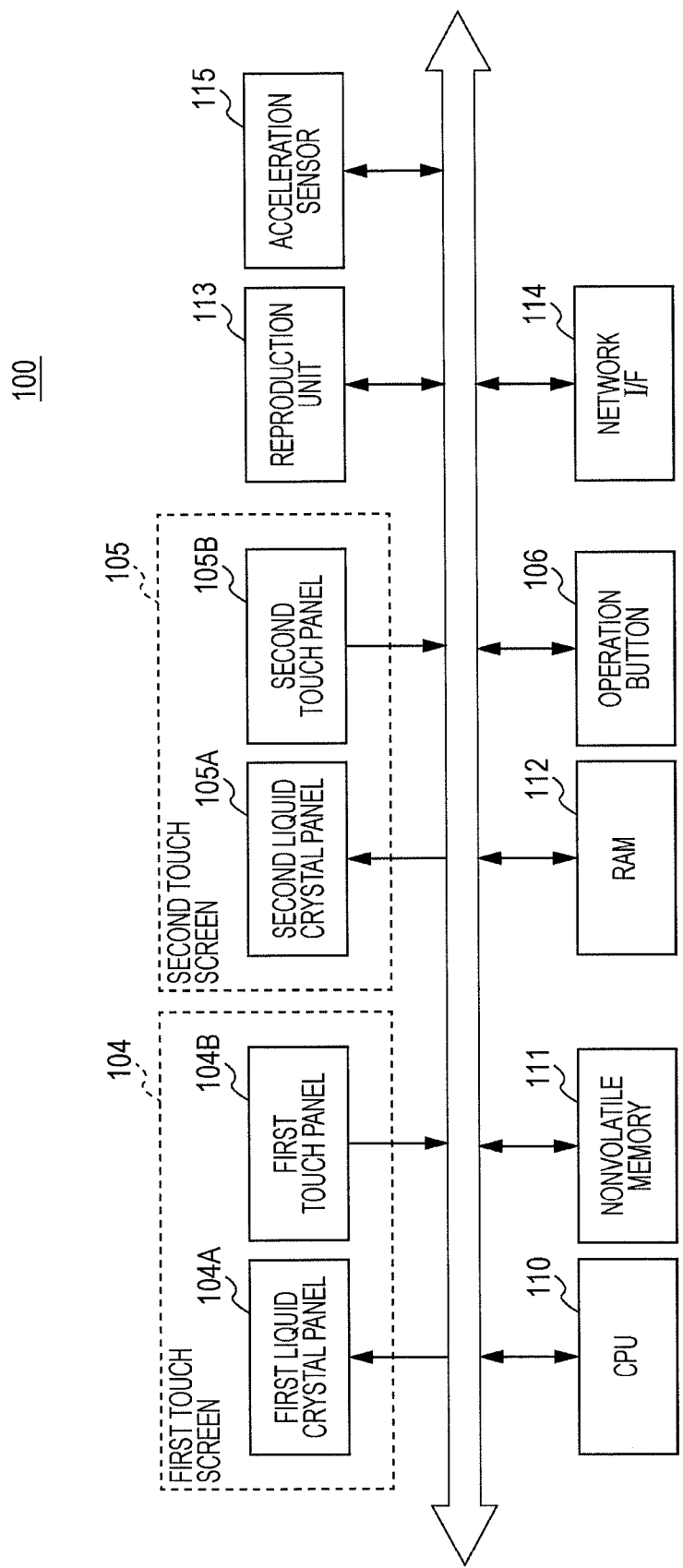
FIG. 3 is a block diagram showing the hardware configuration of the portable terminal.

The hardware configuration of the portable terminal 100 is next described with reference to FIG. 3. In the portable terminal 100, a CPU 110 develops a program stored in a non-volatile memory 111 into a RAM 112 so as to read the program, and performs various processing and controls respective units in accordance with the program. Here, the CPU is an abbreviation of a central processing unit, and the RAM is an abbreviation of a random access memory.

When the CPU 110 recognizes that a touch operation or a proximity operation is performed with respect to the first touch screen 104 and the second touch screen 105, the CPU 110 accepts the operation as an operation input and performs processing corresponding to the operation input.

The first touch screen 104 is composed of a first liquid crystal panel 104A and a first touch panel 104B, and the second touch screen 105 is composed of a second liquid crystal panel 105A and a second touch panel 105B.

The first liquid crystal panel 104A and the second liquid crystal panel 105A display various information in such a manner that they respectively serve as an upper screen and a lower screen.

On the other hand, each of the first touch panel 104B and the second touch panel 105B is a capacitance type touch panel as described above.

The first touch panel 104B includes a plurality of electrostatic sensors (not shown) that are arranged in a lattice-like fashion on the operation surface. In each of the electrostatic sensors, when capacitance does not vary, an output value is "0", but when capacitance varies due to approach of a conducting body such as a finger to the operation surface, the output value varies accordingly.

Figure 4:
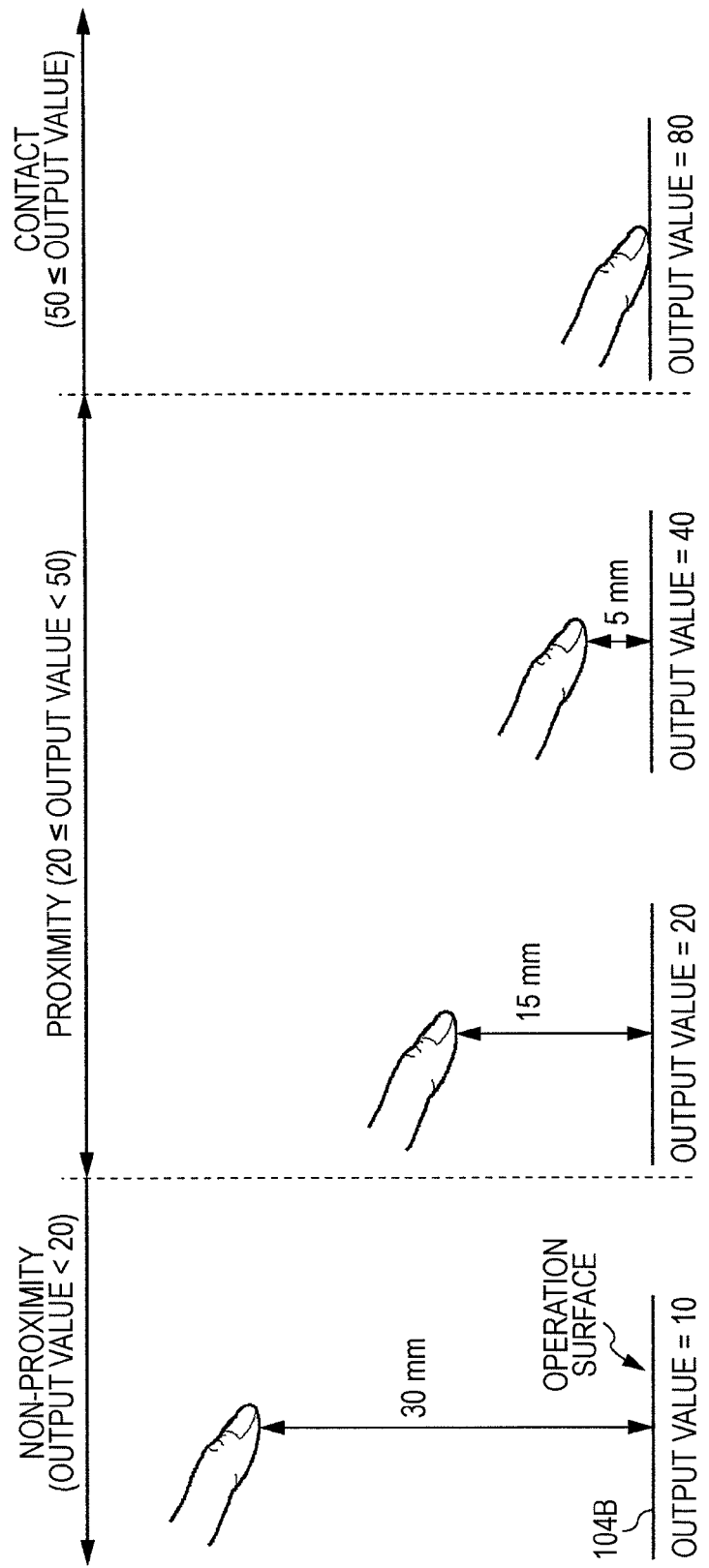
FIG. 4 is a diagram used to describe the variation of an output value of an electrostatic sensor.

Actually, it is assumed that a finger is brought in proximity to the operation surface of the first touch panel 104B as shown in FIG. 4. At this time, an output value of an electrostatic sensor which is positioned directly under the finger varies as follows; when a distance between the operation surface and the finger is 30 mm, the output value becomes "10"; when the distance is 15 mm, the output value becomes "20"; when the distance is 5 mm, the output value becomes "40"; and when the finger is brought into contact with the operation surface, the output value becomes "80" which is the maximum value.

The CPU 110 acquires an output value, which varies as described above, of each of the electrostatic sensors and a position, on the operation surface, of each of the electrostatic sensors from the first touch panel 104B. Then, the CPU 110 discriminates a part with which the finger is in contact, a part to which the finger is in proximity, and a part with or to which the finger is not in contact or is not in proximity on the operation surface of the first touch panel 104B, based on the output value and the position. Here, a part with which the finger is in contact is referred to as a contact part, a part to which the finger is in proximity is referred to as a proximity part, and a part with or to which the finger is not in contact or is not in proximity is referred to as a non-proximity part, as well.

Figure 5:
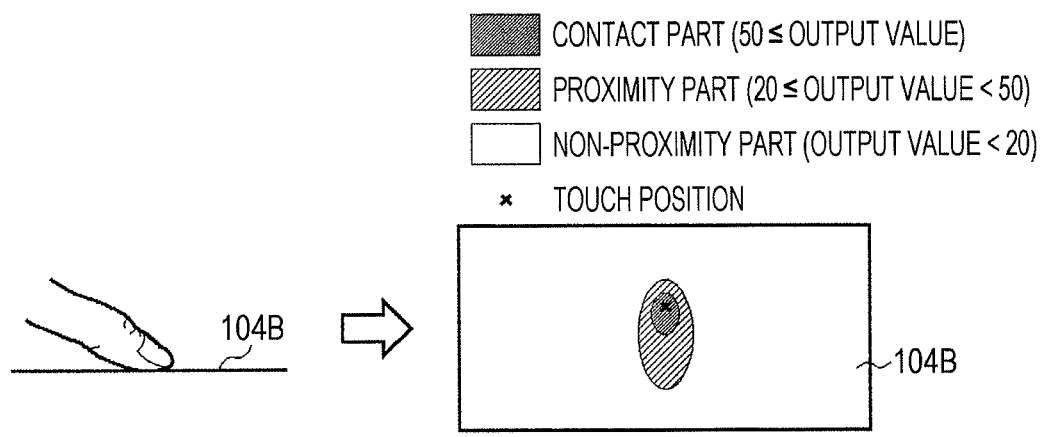
FIG. 5 is a diagram used to describe determination of a contact part, a proximity part, and a non-proximity part.

Specifically, the CPU 110 determines that a part, at which an output value of the electrostatic sensor is "50" or more on the operation surface of the first touch panel 104B, is a contact part, as shown in FIG. 5. Further, the CPU 110 determines that a part, at which an output value is "20" or more and less than "50", is a proximity part, and that a part, at which an output value is less than "20", is a non-proximity part.

The CPU 110 thus determines a contact part, a proximity part, and a non-proximity part on the operation surface of the first touch panel 104B. Accordingly, the CPU 110 can detect whether a finger is in contact with the operation surface or the finger is merely in proximity to the operation surface. Further, the CPU 110 can detect where the finger is in contact or in proximity on the operation surface, as well. When a contact part is present, the CPU 110 recognizes a gravity center of the contact part (that is, a gravity center of a pad of a finger that is in contact with the operation surface) as a touch position. When a contact part is not present, the CPU 110 recognizes a gravity center of the proximity part (that is, a gravity center of a pad of a finger that is in proximity to the operation surface) as a proximity position.

Further, the CPU 110 acquires an output value of each of the electrostatic sensors from the first touch panel 104B at regular time intervals and determines a contact part, a proximity part, and a non-proximity part so as to detect a transition of a touch position and a proximity position based on the determination. The CPU 110 then identifies motion of a finger on the first touch panel 104B based on the transition.

Subsequently, the CPU 110 recognizes a touch operation and a proximity operation with respect to the first touch screen 104 based on the motion, which is identified as above, of the finger on the first touch panel 104B and accepts the operations as an operation input.

As is the case with the first touch panel 104B, the second touch panel 105B also includes a plurality of electrostatic sensors (not shown) that are arranged in a lattice-like fashion on the operation surface.

The CPU 110 acquires an output value of each of the electrostatic sensors also from the second touch panel 105B at regular time intervals and determines a contact part, a proximity part, and a non-proximity part on the operation surface of the second touch panel 105B so as to detect a transition of a touch position and a proximity position.

Then, the CPU 110 identifies motion of a finger on the second touch panel 105B based on the transition, then recognizes a touch operation and a proximity operation with respect to the second touch screen 105 based on the motion of the finger, and accepts the operations as an operation input.

Thus, the CPU 110 recognizes a touch operation and a proximity operation with respect to the first touch screen 104 and the second touch screen 105 and accepts the operations as an operation input so as to perform processing corresponding to the operation input.

Further, when the CPU 110 recognizes a pressing operation with respect to the operation buttons 106, the CPU 110 accepts the pressing operation as an operation input and performs processing corresponding to the operation input.

Here, it is assumed that when a reproduction button for reproducing music data is displayed on the second touch screen 105, a user taps the reproduction button, for example.

In this case, the CPU 110 accepts this touch operation as an operation input for reproducing music data, reads out the music data from the nonvolatile memory 111, and transmits the music data to a reproduction unit 113.

The reproduction unit 113 performs reproduction processing such as decode processing, digital-analog conversion processing, and amplification processing with respect to the music data under control of the CPU 110 so as to obtain an audio signal and output the audio signal from a headphone terminal (not shown).

Accordingly, the user can listen to music through headphones which are connected to the headphone terminal.

At this time, the CPU 110 acquires information such as a title of a music piece and a name of an artist from the read out music data and displays the information on the first liquid crystal panel 104A of the first touch screen 104, for example. Accordingly, the information of music under reproduction can be presented to the user.

Further, it is assumed that when a Web browser icon for activating a Web browser is displayed on the second touch screen 105, a user taps the Web browser icon, for example.

In this case, the CPU 110 accepts this touch operation as an operation input for activating the Web browser, activates the Web browser, and displays a Web browser screen on the first liquid crystal panel 104A and the second liquid crystal panel 105A.

At this time, the CPU 110 communicates with a server on the network through a network interface 114 so as to acquire page data of a Web page from the server. Then, the CPU 110 displays a page image based on the page data on the Web browser screen.

Accordingly, the user can browse the Web page through the Web browser screen.

Further, an acceleration sensor 115 is provided inside the second casing 102, for example, and measures acceleration acting on the second casing 102.

The CPU 110 detects a tilt of the second casing 102 with respect to a gravity force direction based on the acceleration which is measured by the acceleration sensor 115.

Here, a specific hardware example of the detection unit 2 of the information processing device 1 that is described in the outline of the embodiment is the first touch panel 104B and the second touch panel 105B of the portable terminal 100 described above. A specific hardware example of the control unit 3 of the information processing device 1 is the CPU 110 of the portable terminal 100 described above. A specific hardware example of the tilt detection unit 4 of the information processing device 1 is the acceleration sensor 115 and the CPU 110 of the portable terminal 100 described above. In the portable terminal 100, the acceleration sensor 115 and the CPU 110 cooperatively work so as to realize a function equivalent to that of the tilt detection unit 4 of the information processing device 1.

[1-4. Detection of Opening/Closing Angle]

The portable terminal 100 not only accepts a touch operation and a proximity operation as an operation input but also accepts an operation input based on an opening/closing angle of the first casing 101 and the second casing 102.

For example, the portable terminal 100 is designed on the premise that the portable terminal 100 is used in a state that the first casing 101 and the second casing 102 are open. Therefore, when the portable terminal 100 recognizes that the opening/closing angle is decreased and the first casing 101 and the second casing 102 are almost closed, the portable terminal 100 accepts an operation input for turning off the power and turns off the power.

Figure 6:
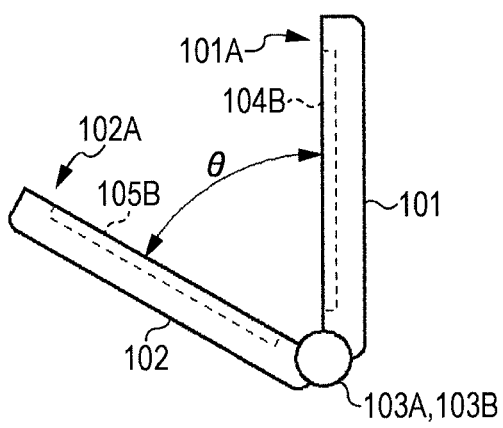
FIG. 6 is a diagram used to describe a definition of an opening/closing angle.

Here, as shown in FIG. 6, it is defined that an opening/closing angle θ of the first casing 101 and the second casing 102 is an angle formed by the front surface 101A of the first casing 101 and the front surface 102A of the second casing 102. That is, the opening/closing angle θ is an angle formed by the operation surface of the first touch panel 104B and the operation surface of the second touch panel 105B, as well.

A method for detecting the opening/closing angle θ in the portable terminal 100 is described in detail below.

In the first touch panel 104B and the second touch panel 105B, capacitance varies not only when a finger is brought in contact with or in proximity to the panels but also when the operation surface of the first touch panel 104B and the operation surface of the second touch panel 105B are opposed to be in proximity to each other. This is because the first touch panel 104B and the second touch panel 105B vary mutual capacitance because the first touch panel 104B and the second touch panel 105B are conducting bodies.

Accordingly, in the portable terminal 100, output values of the first touch panel 104B and the second touch panel 105B vary along with variation of a distance between the operation surface of the first touch panel 104B and the operation surface of the second touch panel 105B, that is, variation of the opening/closing angle θ.

FIGS. 7A to 7F specifically illustrate a variation example of the output values of the first touch panel 104B and the second touch panel 105B in opening/closing of the first casing 101 and the second casing 102. In the following description of FIGS. 7A to 7F, it is assumed that a finger is not in contact with or in proximity to the operation surfaces of the first touch panel 104B and the second touch panel 105B.

For example, when the opening/closing angle θ is 90 degrees as shown in FIG. 7A, the operation surfaces of the first touch panel 104B and the second touch panel 105B are not opposed to each other and are not in proximity to each other.

At this time, the first touch panel 104B and the second touch panel 105B do not vary mutual capacitance, and therefore the output values of the first touch panel 104B and the second touch panel 105B are "0" as shown in FIG. 7B.

When the opening/closing angle θ is 45 degrees as shown in FIG. 7C, for example, the operation surfaces of the first touch panel 104B and the second touch panel 105B are opposed to each other. A distance between the operation surfaces of the first casing 101 and the second casing 102 becomes smaller toward an opening/closing axis of the first casing 101 and the second casing 102 (that is, an axis passing through the coupling units 103A and 103B).

In this case, the output value is "0" at a part, on one operation surface, from which a distance to another operation surface is a predetermined distance (40 mm, for example) or more (that is, a part distant from the opening/closing axis), as shown in FIG. 7D.

Further, the output value is larger than "0" at a part, on one operation surface, from which the distance to another operation surface is a predetermined distance or less (that is, a part close to the opening/closing axis).

In this part, the output value increases in a phased manner toward the opening/closing axis on a line vertical to the opening/closing axis of the first casing 101 and the second casing 102 (a line in a Y direction in the drawing, which is referred to below as a vertical line, as well). Further, in this part, the output value is almost constant on a line parallel to the opening/closing axis of the first casing 101 and the second casing 102 (a line in an X direction in the drawing, which is referred to below as a parallel line, as well).

Further, when the opening/closing angle θ is 30 degrees as shown in FIG. 7E, for example, the operation surface of the first touch panel 104B and the operation surface of the second touch panel 105B are opposed to each other, and the distance between the first touch panel 104B and the second touch panel 105B becomes smaller toward the opening/closing axis. The distance between the operation surfaces is smaller than the distance of the case where the opening/closing angle θ is 45 degrees shown in FIG. 7C.

In this case as well, the output value is "0" at a part, on one operation surface, from which the distance to another operation surface is a predetermined distance or more, as shown in FIG. 7F. However, the part is narrower than the part of the case where the opening/closing angle θ is 45 degrees shown in FIG. 7D.

Further, the output value is more than "0" at a part, on one operation surface, from which the distance to another operation surface is a predetermined distance or less. In this part, the output value is larger in whole than that of the case where the opening/closing angle θ is 45 degrees.

Further, in this part, the output value increases in a phased manner toward the opening/closing axis on a vertical line and is almost constant on a parallel line, in a similar manner to the case where the opening/closing angle θ is 45 degrees.

Thus, in a case where the opening/closing angle θ is large at an extent that the operation surface of the first touch panel 104B and the operation surface of the second touch panel 105B are not opposed to each other, the output values of the first touch panel 104B and the second touch panel 105B become "0".

In a case where the operation surface of the first touch panel 104B and the operation surface of the second touch panel 105B are opposed to each other to be in proximity to each other, the output values become large in whole as the opening/closing angle θ is smaller. In this case, the output values increase in a phased manner toward the opening/closing axis on the vertical line, while the output values are almost constant on the parallel line.

On the basis of the above, the portable terminal 100 detects the opening/closing angle θ by using the output value of the first touch panel 104B or the second touch panel 105B.

In reality, the output values of the first touch panel 104B and the second touch panel 105B vary also when a finger of a user is brought in contact with or in proximity to the operation surface, as described above.

Accordingly, in order to detect the opening/closing angle θ in the portable terminal 100, it is necessary to use an output value which is not affected by proximity or contact of a finger.

Figure 8A:
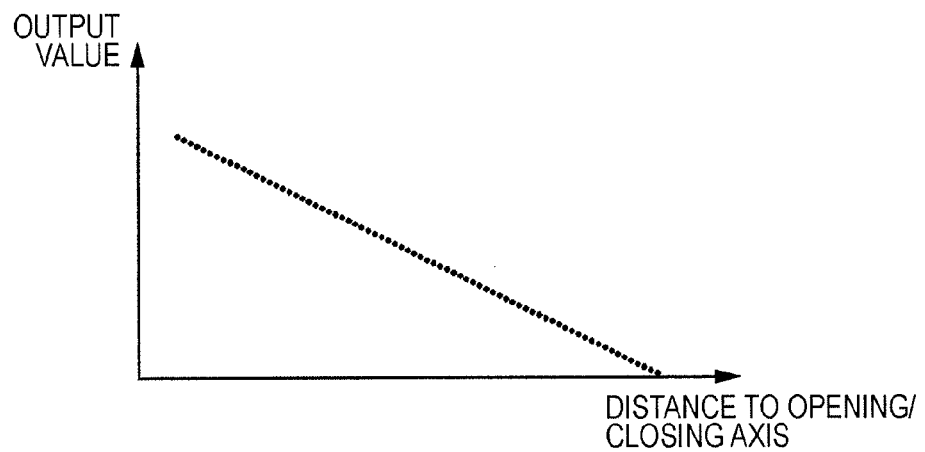
FIGS. 8A and 8B are diagrams used to describe an output value on a vertical line.
Figure 8B:
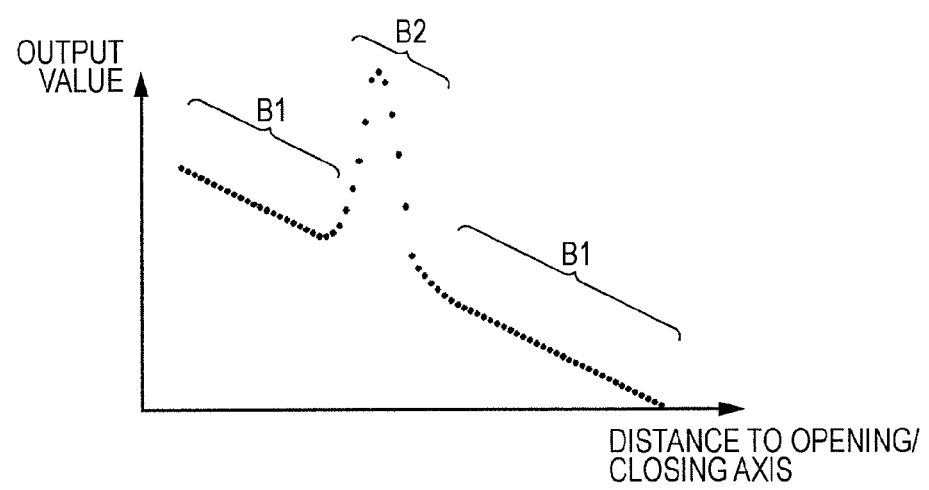

FIGS. 8A and 8B illustrate an output value on a vertical line in a case where the operation surfaces are in proximity to each other and a finger is in proximity to or in contact with the operation surface. FIG. 8A illustrates an output value on a vertical line which does not pass through a part to or with which a finger is in proximity or in contact, and FIG. 8B illustrates an output value on a vertical line which passes through the part to or with which a finger is in proximity or in contact. In FIGS. 8A and 8B, a vertical axis indicates an output value and a horizontal axis indicates a distance to the opening/closing axis.

As shown in FIG. 8A, on the vertical line that does not pass through the part to or with which a finger is in proximity or in contact, the output value increases in a phased manner toward the opening/closing axis as also shown in FIGS. 7D and 7F described above.

On the other hand, as shown in FIG. 8B, the vertical line that passes through the part to or with which a finger is in proximity or in contact has a part B1 in which the output value increases in a phased manner and a part B2 in which the output value locally rises.

It can be considered that the part B1 in which the output value increases in a phased manner is a part in which the output value varies along with the proximity between the operation surfaces, and that the part B2 in which the output value locally rises is a part in which the output value varies due to contact or proximity of a finger. This is because it can be considered that when a finger is in contact with or in proximity to the operation surface, the finger is in more proximity to the operation surface which the user is to operate than another operation surface.

Therefore, it can be considered that the vertical line on which the output value locally rises is a vertical line that passes through the part to or with which a finger is in proximity or in contact, and part of output values on the line is affected by the proximity or the contact of the finger. On the other hand, it can be considered that the vertical line on which the output value does not locally rise is a vertical line that does not pass through the part to or with which a finger is in proximity or in contact, and all output values on the line are not affected by the proximity or the contact of the finger.

Therefore, the CPU 110 detects a vertical line, on which the output value does not locally rise, on the operation surface of the first touch panel 104B, based on output values obtained from the first touch panel 104B, for example. Here, the CPU 110 checks difference between output values on adjacent positions on each vertical line so as to determine whether the output value locally rises.

Then, the CPU 110 detects the opening/closing angle θ based on the output value on the vertical line on which the output value does not locally rise, that is, the output value which is not affected by proximity or contact of a finger.

Here, a method for detecting the opening/closing angle θ by using an output value is specifically described.

In a case where the operation surfaces are in proximity to each other, there is such relationship between the output value and the opening/closing angle θ that output values become larger in whole as the opening/closing angle θ is smaller as described above.

Therefore, the portable terminal 100 calculates the opening/closing angle θ with an expression which is preliminarily stored in the nonvolatile memory 111 and expresses a relationship between the output value and the opening/closing angle θ.

Specifically, output values at times when the first casing 101 and the second casing 102 are opened at arbitral opening/closing angles θ (for example, angles every 5 degrees such as 10 degrees, 15 degrees, and the like) are measured in a state that a finger is not in proximity to or in contact with the operation surface, in manufacturing of the portable terminal 100, for example.

Here, an output value of an electrostatic sensor which is positioned closest to the opening/closing axis on the operation surface is measured, for example.

Then, expression (1) which is shown below and expresses a relationship between an output value C and an opening/closing angle θ is formed based on the measurement result with a least-square method, for example, and expression (1) is stored in the nonvolatile memory 111.

$$\theta = f(C)\ (C>0),\ \theta = 90\ (C=0) \quad (1)$$

A case where the output value C is "0" indicates that the operation surfaces are not in proximity to each other and the opening/closing angle θ is 90 degrees or more. In this case, the opening/closing angle θ is rounded to "90" based on expression (1).

When the portable terminal 100 is shipped out and practically used, the CPU 110 detects one vertical line, for example, on which an output value does not locally rise, on the operation surface of the first touch panel 104B, as described above.

Then, the CPU 110 substitutes an output value at a position closest to the opening/closing axis on the detected vertical line into expression (1), which is stored in the nonvolatile memory 111, as the output value C so as to calculate the opening/closing angle θ.

The CPU 110 may detect a plurality of vertical lines, on which an output value does not locally rise, from the first touch panel 104B. In this case, the CPU 110 takes out output values at positions closest to the opening/closing axis, on respective vertical lines, calculates an average value, and substitutes the average value into expression (1) so as to calculate the opening/closing angle θ.

Thus, the portable terminal 100 detects the opening/closing angle θ.

By the way, when the CPU 110 recognizes a touch operation and a proximity operation described above, the CPU 110 detects a part, in which an output value locally rises, on each of the touch panels on the basis of the output values of the first touch panel 104B and the second touch panel 105B. The CPU 110 checks difference between output values at adjacent positions on each of the vertical lines, for example, so as to detect a part in which an output value locally rises. Thus, the CPU 110 detects a part in which an output value varies in accordance with proximity or contact of a finger.

Then, the CPU 110 determines a contact part, a proximity part, and a non-proximity part based on the output value of the part and identifies motion of the finger so as to recognize the touch operation or the proximity operation, as described above.

Further, the CPU 110 accepts various operation inputs depending on a detected opening/closing angle θ.

For example, when the CPU 110 recognizes that the detected opening/closing angle θ is equal to or less than a predetermined angle (10 degrees, for example) at which it is considered that the first casing 101 and the second casing 102 are almost closed, the CPU 110 accepts an operation input for turning off the power. Then, the CPU 110 turns off the power in response to the operation input.

Accordingly, even if a user finishes a use of the portable terminal 100 and forgets to press a power-off button (not shown), the portable terminal 100 can turn off the power and suppress power consumption.

Further, the CPU 110 accepts various operation inputs depending on the opening/closing angle θ in also a case where an application for browsing electronic books (also referred to below as a book reader application) is activated.

An electronic book browsing operation in the book reader application is now described. When an arbitral electronic book is selected by a predetermined user operation, the CPU 110 reads out book data corresponding to the electronic book from the nonvolatile memory 111. Here, the book data includes data of plurality of page images constituting one book, and the like.

Figure 9:
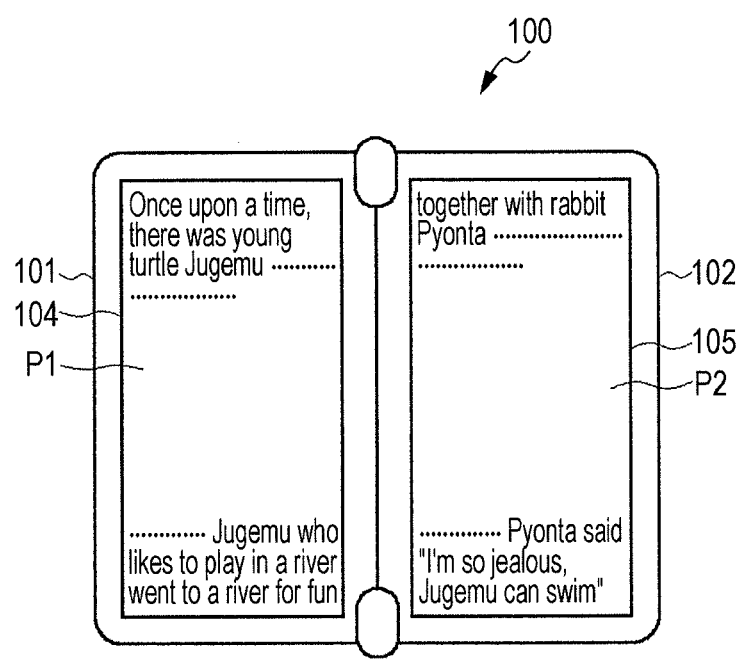
FIG. 9 is a diagram used to describe a screen display example of an electronic book.

In this book reader application, the first touch screen 104 is used as a left screen, and the second touch screen 105 is used as a right screen, for example. The CPU 110 displays page images P1 and P2, which are the first two pages in the read out book data, respectively on the first liquid crystal panel 104A and the second liquid crystal panel 105A, as shown in FIG. 9.

Figure 10:
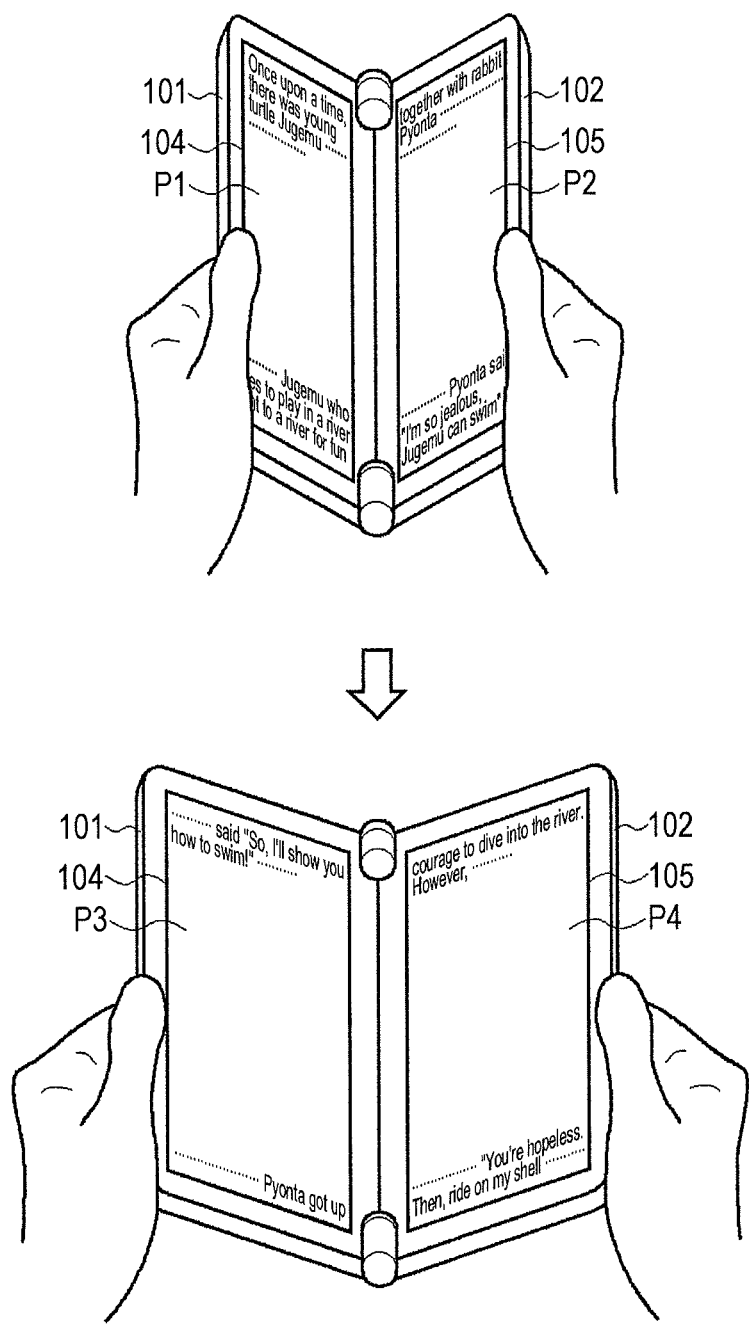
FIG. 10 is a diagram used to describe an operation input for flipping a page.

Here, it is assumed that a user performs an opening/closing operation in which the user slightly closes the first casing 101 and the second casing 102 and then opens them, that is, the user performs an operation as if the user opens/closes a paper book so as to flip a page of the paper book, as shown in FIG. 10.

At this time, the CPU 110 monitors variation of the opening/closing angle θ. When the CPU 110 detects that the opening/closing angle θ once decreases and then increases, the CPU 110 accepts an operation input for flipping a page. Here, when a variation amount in the decrease of the opening/closing angle θ and a variation amount in the increase of the opening/closing angle θ are equal to or more than a predetermined value, the CPU 110 accepts an operation input for flipping a page. The predetermined value is preliminarily set based on a variation amount (which is obtained by an experiment, for example) of an opening/closing angle which is obtained when a user actually opens and closes a book so as to flip a page.

Then, the CPU 110 switches displays of the first liquid crystal panel 104A and the second liquid crystal panel 105A respectively to page images P3 and P4 that are the next two pages (a third page and a fourth page in this example) in response to the operation input.

Thus, whenever an operation in which the first casing 101 and the second casing 102 are slightly closed and then opened is performed, the CPU 110 accepts the operation input for flipping a page and switches displays of the first liquid crystal panel 104A and the second liquid crystal panel 105A to next page images.

Accordingly, when a user performs an intuitive operation like opening/closing a book for flipping a page, the portable terminal 100 can flip a page of an electronic book.

Further, it is assumed that when page images of an electronic book are displayed in the portable terminal 100, a user performs an operation tilting the whole of the portable terminal 100 to a left side or a right side in a state that the user slightly closes the first casing 101 and the second casing 102, as shown in FIG. 11. That is, it is assumed that the user performs an operation as if the user slightly closes and tilts a paper book so as to continuously flip through the pages of the paper book.

When the CPU 110 recognizes variation of a tilt of the second casing 102 via the acceleration sensor 115 in a state that the opening/closing angle B is within a predetermined range, the CPU 110 accepts an operation input for continuously flipping through pages.

Here, the predetermined range of the opening/closing angle θ is preliminarily set based on an opening/closing angle (which is obtained by an experiment, for example) which is obtained when a user actually closes a book so as to continuously flip through pages of the book. The minimum value in the predetermined range is set to be larger than an angle at which it is considered that the first casing 101 and the second casing 102 are almost closed.

When a variation amount of the tilt of the second casing 102 is equal to or more than a predetermined value, the CPU 110 accepts an operation input for continuously flipping through pages. Here, the predetermined value is preliminarily set based on a variation amount (which is obtained by an experiment, for example) of a tilt of a book which is obtained when a user actually continuously flips through pages of the book.

Then, when the tilt of the second casing 102 varies to the left side in this operation input, the CPU 110 continuously switches displays of the first liquid crystal panel 104A and the second liquid crystal panel 105A as if pages are continuously flipped through page by page to the left side.

On the other hand, when the tilt of the second casing 102 varies to the right side in this operation input, the CPU 110 continuously switches displays of the first liquid crystal panel 104A and the second liquid crystal panel 105A as if pages are continuously flipped through page by page to the right side.

At this time, as the variation amount of the tilt of the second casing 102 is larger, the CPU 110 increases a speed for flipping pages.

When the user touches the first touch panel 104B or the second touch panel 105B by his/her finger in a state that the portable terminal 100 continuously flips through pages, the CPU 110 stops flipping through pages.

Thus, when the user performs an intuitive operation like slightly closing and tilting a book for continuously flipping through pages, the portable terminal 100 can continuously flip through pages of an electronic book.

As described above, the portable terminal 100 detects the opening/closing angle θ of the first casing 101 and the second casing 102, and accepts an operation input based on the opening/closing angle θ.

[1-5. Opening/Closing Angle Detection Processing Procedure]

Figure 12:
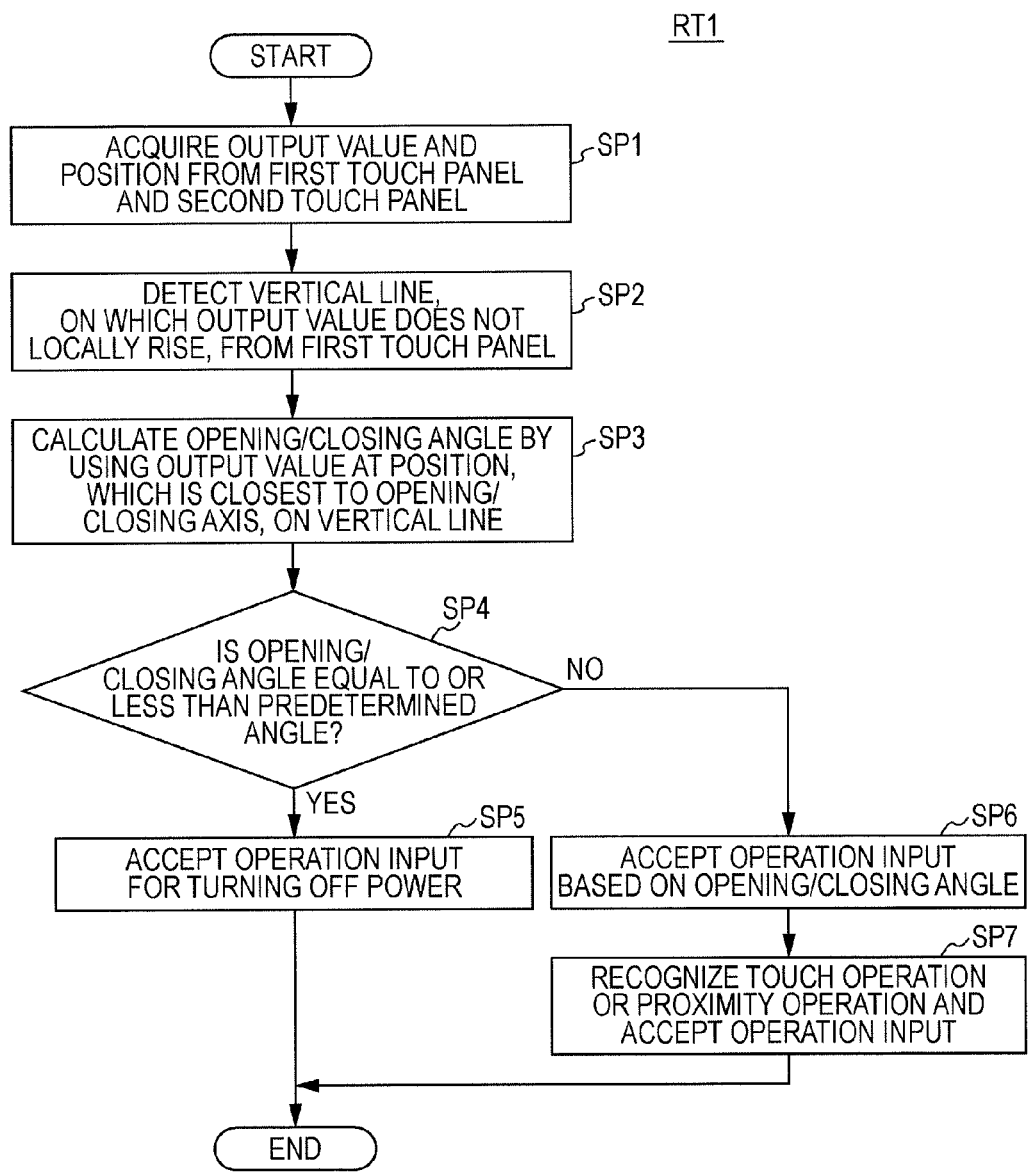
FIG. 12 is a flowchart showing an opening/closing angle detection processing procedure.

A procedure RT1 of processing for detecting the opening/closing angle θ described above (also referred to as an opening/closing angle detection processing procedure) is now described with reference to a flowchart shown in FIG. 12. The opening/closing angle detection processing procedure RT1 is a processing procedure which is performed by the CPU 110 in accordance with a program stored in the nonvolatile memory 111.

Further, the opening/closing angle detection processing procedure RT1 is performed at predetermined time intervals during power-on of the portable terminal 100.

When the CPU 110 starts the opening/closing angle detection processing procedure RT1, the CPU 110 advances the processing to step SP1.

In step SP1, the CPU 110 acquires an output value and a position from each electrostatic sensor of the first touch panel 104B and the second touch panel 105B. Then, the CPU 110 advances the processing to the following step, that is, step SP2.

In step SP2, the CPU 110 detects a vertical line, on which an output value does not locally rise, based on the output value of the first touch panel 104B. Then, the CPU 110 advances the processing to the following step, that is, step SP3.

In step SP3, the CPU 110 calculates the opening/closing angle θ with expression (1) described above by using an output value at a position, which is closest to the opening/closing axis of the first casing 101 and the second casing 102, of the detected vertical line. Then, the CPU 110 advances the processing to the following step, that is, step SP4.

In step SP4, the CPU 110 determines whether the opening/closing angle θ is equal to or less than a predetermined angle at which it is considered that the first casing 101 and the second casing 102 are almost closed.

When the opening/closing angle θ is equal to or less than the predetermined angle in step SP4, it indicates a state in which the first casing 101 and the second casing 102 are almost closed. Then, the CPU 110 advances the processing to the next step, that is, step SP5.

In step SP5, the CPU 110 accepts an operation input for turning off the power of the portable terminal 100 and turns off the power of the portable terminal 100 so as to end the opening/closing angle detection processing procedure RT1.

On the other hand, when the opening/closing angle θ is more than the predetermined angle in step SP4, it indicates a state in which the first casing 101 and the second casing 102 are open. Then, the CPU 110 advances the processing to the next step, that is, step SP6.

In step SP6, the CPU 110 accepts an operation input which is based on the opening/closing angle θ and performs processing corresponding to the operation input. Then, the CPU 110 advances the processing to the following step, that is, step SP7. For example, in a case where a book reader application is activated, the CPU 110 accepts an operation input for flipping a page or an operation input for continuously flipping through pages and performs processing corresponding to the operation input, as described above.

In step SP7, the CPU 110 detects a part, at which the output value locally rises, based on the output values of the first touch panel 104B and the second touch panel 105B, on each of the touch panels. The CPU 110 determines a contact part, a proximity part, and a non-proximity part based on the output value of the part and identifies motion of a finger so as to recognize a touch operation or a proximity operation, as described above. Then, the CPU 110 accepts the recognized touch operation or proximity operation as an operation input and performs processing corresponding to the operation input. Then, the CPU 110 ends the opening/closing angle detection processing procedure RT1.

[1-6. Operation and Advantageous Effect]

In the configuration described above, the portable terminal 100 detects a vertical line on which an output value does not locally rise, based on the output value of the first touch panel 104B.

Since the output value on the vertical line does not locally rise, the output value is not affected by proximity or contact of a finger. The operation surface is provided on a surface, at which the first casing 101 and the second casing 102 are opposed to each other when they are opened/closed, of the first touch panel 104B.

Therefore, if the portable terminal 100 detects the vertical line, the portable terminal 100 extracts a component, which varies along with proximity of the first casing 101 and the second casing 102 in their opening/closing, from the output value of the first touch panel 104B, as a result.

Then, the portable terminal 100 detects the opening/closing angle θ based on an output value at a position, which is closest to the opening/closing axis of the first casing 101 and the second casing 102, of the vertical line.

Thus, the portable terminal 100 detects the opening/closing angle θ by using the output value of the first touch panel 104B that is provided for accepting an operation input. Accordingly, the portable terminal 100 can detect the opening/closing angle θ without a separate provision of a dedicated sensor for detecting the opening/closing angle θ.

The portable terminal 100 not only accepts a touch operation or a proximity operation as an operation input but also accepts an operation input based on the opening/closing angle θ. Thus, the portable terminal 100 can accept more various types of operation inputs.

According to the configuration described above, the portable terminal 100 extracts a variation component, which varies along with proximity of the first casing 101 and the second casing 102 in their opening/closing, based on the output value of the first touch panel 104B, and detects the opening/closing angle θ based on the variation component.

Accordingly, the portable terminal 100 can detect the opening/closing angle θ without a dedicated sensor. Thus, the portable terminal 100 can detect the opening/closing angle θ with the simple configuration.

<2. Other Embodiment>

[2-1. Other Embodiment 1]

In the above-described embodiment, the CPU 110 calculates the opening/closing angle θ with expression (1) described above by using an output value at a position, which is closest to the opening/closing axis, of a vertical line on which the output value does not locally rise.

Not limited to this, the CPU 110 may detect the opening/closing angle θ with other various methods by using output values at a plurality of positions on a vertical line on which an output value does not locally rise.

For example, the CPU 110 may detect the opening/closing angle θ based on a shape of a graph (FIG. 8A, for example) expressing a relationship between an output value on a vertical line, on which the output value does not locally rise, and a distance to the opening/closing axis.

As shown in FIGS. 7A to 7F described above, on a vertical line on which an output value does not locally rise, that is, on a vertical line on which the output value varies along with proximity of the first casing 101 and the second casing 102 in their opening/closing, the output value increases in a phased manner toward the opening/closing axis.

As the opening/closing angle θ is decreased, a part in which the output value is more than "0" is enlarged and output values are large in whole.

Accordingly, in the portable terminal 100, a shape of a graph expressing a relationship between the output value and the distance to the opening/closing axis varies along with variation of the opening/closing angle θ.

Therefore, the CPU 110 preliminarily stores a graph in the nonvolatile memory 111. The graph expresses a relationship between an output value and a distance to the opening/closing axis in each opening/closing angle θ (for example, angles every 5 degrees such as 10 degrees, 15 degrees, and the like) in a state that a finger is not in proximity to or in contact with an operation surface.

Then, when the CPU 110 detects a vertical line, on which an output value does not locally rise, based on the output value of the first touch panel 104B, for example, the CPU 110 forms a graph expressing a relationship between an output value and a distance to the opening/closing axis, on the vertical line.

Subsequently, the CPU 110 pattern-matches the graph which is formed and the graph which is preliminarily stored in the nonvolatile memory 111 and expresses the relationship between the output value and the distance to the opening/closing axis in each opening/closing angle θ so as to detect the opening/closing angle θ.

Accordingly, the portable terminal 100 can receive less effect such as a noise than a case using an output value of one position on a vertical line on which an output value does not locally rise, and can detect the opening/closing angle θ with higher accuracy.

[2-2. Other Embodiment 2]

In the embodiment described first, the CPU 110 detects a vertical line on which an output value does not locally rise so as to extract a component which varies along with proximity of the first casing 101 and the second casing 102 in their opening/closing.

Not limited to this, the CPU 110 may extract a component, which varies along with proximity of the first casing 101 and the second casing 102 in their opening/closing, based on an output value of the first touch panel 104B or the second touch panel 105B, by other various methods.

For example, the CPU 110 may take out an output value at a part other than a part on which the output value locally rises, of a parallel line which is closest to the opening/closing axis so as to extract a component which varies along with proximity of the first casing 101 and the second casing 102 in their opening/closing.

Further, for example, the CPU 110 may take out an output value on a part, at which the output value varies in a phased manner, of a vertical line so as to extract a component which varies along with proximity of the first casing 101 and the second casing 102 in their opening/closing.

[2-3. Other Embodiment 3]

Further, in the embodiment described first, the CPU 110 extracts a component, which varies along with proximity of the first casing 101 and the second casing 102 in their opening/closing, based on the output value of the first touch panel 104B.

Not limited to this, the CPU 110 may extract a component, which varies along with proximity of the first casing 101 and the second casing 102 in their opening/closing, based on output values of both of the first touch panel 104B and the second touch panel 105B.

In this case, the CPU 110 detects a predetermined number of vertical lines (three vertical lines, for example), on which an output value does not locally rises, from each of the first touch panel 104B and the second touch panel 105B, for example.

Then, the CPU 110 takes out output values at positions closest to the opening/closing axis in respective lines of the plurality of vertical lines and calculates an average value of the output values which are taken out. Then, the CPU 110 substitutes the average value into expression (1) described above so as to calculate the opening/closing angle θ.

Accordingly, the portable terminal 100 can reduce an effect such as a noise of the output value and therefore can calculate the opening/closing angle θ in higher accuracy.

Alternatively, the CPU 110 may select a touch panel from which the CPU 110 extracts a component, which varies along with proximity of the first casing 101 and the second casing 102 in their opening/closing, in each case.

For example, the CPU 110 selects a touch panel which is not operated by a user between the first touch panel 104B and the second touch panel 105B. Then, the CPU 110 may extract a component, which varies along with proximity of the first casing 101 and the second casing 102 in their opening/closing, based on the output value of the selected touch panel.

It is considered that when a user operates a touch panel, an operation surface of the touch panel which is operated by the user is closer to a finger and an operation surface of another touch panel is more distant from the finger. Therefore, it is considered that the output value of the touch panel which is operated by the user is larger.

In this case, the CPU 110 calculates a sum of output values of respective electrostatic sensors of the first touch panel 104B and a sum of output values of respective electrostatic sensors of the second touch panel 105B. Then, the CPU 110 compares these sums of the output values of the two touch panels to each other and selects the touch panel of which the sum is smaller as a touch panel which is not operated by the user.

Then, the CPU 110 detects a vertical line, on which an output value does not locally rise, based on the output value of the touch panel which is not operated by the user so as to calculate the opening/closing angle θ by using the output value on the vertical line, as is the case with the embodiment described first.

Thus, the portable terminal 100 extracts a component, which varies along with proximity of the first casing 101 and the second casing 102 in their opening/closing, based on the output value of the touch panel which is not operated by a user, that is, the touch panel which is less affected by proximity or contact of a finger. Accordingly, the portable terminal 100 can reduce an effect such as a noise resulting from proximity or contact of a finger and can extract the component in high accuracy. Therefore, the portable terminal 100 can detect the opening/closing angle θ in higher accuracy.

[2-4. Other Embodiment 4]

In the embodiment described first, the CPU 110 accepts an operation input for turning off the power or an operation input for flipping a page in the book reader application, based on the opening/closing angle θ.

Not limited to this, the CPU 110 may accept other various operation inputs based on the opening/closing angle θ.

For example, when the CPU 110 recognizes that the opening/closing angle θ is equal to or less than a predetermined angle at which it is considered that the first casing 101 and the second casing 102 are almost closed, the CPU 110 may accept an operation input for switching to a power saving mode. After that, when the CPU 110 recognizes that the opening/closing angle θ is equal to or more than a predetermined angle at which it is considered that the first casing 101 and the second casing 102 are opened by a user, the CPU 110 may accept an operation input for finishing the power saving mode.

Further, for example, the CPU 110 may display not only the above described electronic books but also other various images respectively on the first liquid crystal panel 104A and the second liquid crystal panel 105A.

Then, the CPU 110 monitors variation of the opening/closing angle θ. When the CPU 110 detects that the opening/closing angle θ once decreases and then increases, the CPU 110 may accept an operation input for flipping (switching) images. When the CPU 110 recognizes that the tilt of the second casing 102 varies in a state that the opening/closing angle θ is within a predetermined range, the CPU 110 may accept an operation input for continuously flipping through images (that is, for continuously switching images).

[2-5. Other Embodiment 5]

In the embodiment described first, the portable terminal 100 is composed of the first casing 101 and the second casing 102 which are coupled in an openable and closable manner by the coupling parts 103A and 103B.

Not limited to this, the portable terminal 100 may have other various configurations as long as two casings are coupled in an openable and closable manner.

[2-6. Other Example 6]

In the embodiment described first, the first touch panel 104B is provided on the front surface 101A of the first casing 101 and the second touch panel 105B is provided on the front surface 102A of the second casing 102 in the portable terminal 100.

Alternatively, a touch panel that is capable of detecting an object which is in contact with or in proximity to the panel may be provided on either of the front surface 101A of the first casing 101 or the front surface 102A of the second casing 102 in the portable terminal 100. In this case, a casing on which a touch panel is not provided may be a casing of which proximity can be detected by a touch panel. For example, in a case where a capacitance type touch panel is used, proximity of a casing having conductivity in whole such as a casing on which a liquid crystal panel is provided can be detected by the touch panel.

[2-7. Other Embodiment 7]

In the embodiment described first, an instruction object performing a touch operation or a proximity operation with respect to the first touch panel 104B and the second touch panel 105B is a finger of a user. Alternatively, other various instruction objects such as a pencil, a stick, a dedicated touch pen may be used as long as contact or proximity of the instruction object can be detected by a touch panel.

[2-8. Other Embodiment 8]

In the embodiment described first, the first touch panel 104B and the second touch panel 105B that are capacitance type touch panels are provided for the portable terminal 100 as a device for detecting a position of an object which is in contact with or in proximity to the operation surface.

Alternatively, other various operation input devices, such as a light-sensor type touch screen which includes a light sensor within a liquid crystal panel thereof, may be provided for the portable terminal 100 as long as they are capable of detecting a position of an object which is in contact with or in proximity to the operation surface.

Further, other various display devices such as an organic electro luminescence (EL) panel may be provided instead of the first liquid crystal panel 104A and the second liquid crystal panel 105A.

[2-9. Other Embodiment 9]

In the embodiment described first, the first touch panel 104B and the second touch panel 105B serving as the detection unit are provided for the portable terminal 100 serving as the information processing device 1. Further, the CPU 110 serving as the control unit and the tilt detection unit and the acceleration sensor 115 serving as the tilt detection unit are provided for the portable terminal 100.

Alternatively, above-described respective units of the portable terminal 100 may be composed of various hardware or software as long as the hardware or software has an equivalent function.

In the embodiment described first, the embodiment is applied to the portable terminal 100. Alternatively, the embodiment may be or can be applied to other various information processing devices such as a portable telephone set, a game machine as long as the information processing devices have openable/closable casings.

[2-10. Other Embodiment 10]

In the embodiment described first, a program for performing various processing is written in the nonvolatile memory 111 of the portable terminal 100.

Not limited to this, the program may be stored in a storage medium such as a memory card, for example, and the CPU 110 may read out the program from the storage medium so as to perform the processing. Further, the CPU 110 may download the program through the network interface 114 and installs the program into the nonvolatile memory 111.

[2-11. Other Embodiment 11]

The present invention is not limited to the above-described embodiments. That is, an application scope of the present invention covers the configuration obtained by arbitrarily combining a part or all of the above-described embodiments or the configuration obtained by extracting a part of the embodiments.

The present application contains subject matter related to that disclosed in Japanese Priority Patent Application JP 2010-005998 filed in the Japan Patent Office on Jan. 14, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
    a first casing;
    a second casing provided to be foldably coupled to the first casing;
    a detection unit configured to detect at least one of a contact by an operation input and a proximity of the operation input with respect to an operation surface provided upon the first casing, and also detect a proximity of the second casing with respect to the operation surface; and
    a control unit configured to extract a proximity variation component based on the detected proximity of the second casing with respect to the operation surface, the proximity variation component varying along with a change in proximity of the second casing with respect to the operation surface when the second casing is foldably moved with respect to the first casing, and determine a relative angle between the first casing and the second casing based on the proximity variation component,
    wherein the proximity variation component gradually changes as a function of distance from a folding axis along which the first casing and the second casing are joined.

2. The information processing device according to claim 1, wherein the control unit determines the relative angle between the first casing and the second casing based on the proximity variation component at a position on the operation surface, the position being closest to the folding axis along which the first casing and the second casing are joined.

3. The information processing device according to claim 1, wherein the control unit determines the relative angle between the first casing and the second casing based on the proximity variation component along a line on the operation surface, the line being perpendicular to the folding axis along which the first casing and the second casing are joined.

4. The information processing device according to claim 1, wherein the control unit accepts the operation input based on the relative angle between the first casing and the second casing.

5. The information processing device according to claim 1, further comprising:
    a first display provided on the first casing; and
    a second display provided on the second casing,
    wherein the control unit controls the first display and the second display to display respective images thereon, and switches the displaying of at least one current image displayed upon at least one of the first display and the second display, based on variation of the relative angle between the first casing and the second casing.

6. The information processing device according to claim 1, further comprising:
    a tilt detection unit configured to detect a tilt of at least one of the first casing and the second casing; wherein
    the control unit controls a first display and a second display to display respective images thereon, and continuously switches the images being displayed based on variation of the tilt, when the relative angle is within a predetermined range.

7. A method for determining a relative angle between a first casing and a second casing provided to be foldably coupled to the first casing, the method comprising:
    detecting at least one of a contact by an operation input and a proximity of the operation input with respect to an operation surface provided upon the first casing;
    detecting a proximity of the second casing with respect to the operation surface;
    extracting a proximity variation component based on the detected proximity of the second casing with respect to the operation surface, the proximity variation component varying along with a change in proximity of the second casing with respect to the operation surface when the second casing is foldably moved with respect to the first casing; and determining the relative angle between the first casing and the second casing based on the proximity variation component, wherein the proximity variation component gradually changes as a function of distance from a folding axis along which the first casing and the second casing are joined.

8. A non-transitory computer-readable medium having embodied thereon a program, which when executed by a computer, causes the computer to perform a method for detecting a relative angle between a first casing and a second casing provided to be foldably coupled to the first casing, the method comprising:

detecting at least one of a contact by an operation input and a proximity of the operation input with respect to an operation surface provided upon the first casing;

detecting a proximity of the second casing with respect to the operation surface;

extracting a proximity variation component based on the detected proximity of the second casing with respect to the operation surface, the proximity variation component varying along with a change in proximity of the second casing with respect to the operation surface when the second casing is foldably moved with respect to the first casing; and determining the relative angle between the first casing and the second casing based on the proximity variation component, wherein the proximity variation component gradually changes as a function of distance from a folding axis along which the first casing and the second casing are joined.

9. The information processing device according to claim 1, wherein the control unit determines the relative angle between the first casing and the second casing based on the change of the proximity variation component along the operation surface in a direction perpendicular to the folding axis along which the first casing and the second casing are joined.

10. The information processing device according to claim 1, wherein the change of the proximity variation component occurs in a phased manner.

11. The information processing device according to claim 1, wherein the control unit determines the relative angle by comparing the proximity variation component with a plurality of output values correlated with respective associated angles, selecting one of the output values that corresponds to the proximity variation component, and obtaining the associated angle correlated with the selected one of the output values as the relative angle.

12. The information processing device according to claim 1, wherein the control unit performs an operation function based on the determined relative angle.

13. The information processing device according to claim 5, wherein the control unit executes an operation function and controls at least one of the first display and the second display to change the at least one current image being displayed thereon, the operation function determined based on the determined relative angle.

14. The information processing device according to claim 1, wherein the operation surface comprises a touch screen.

15. The information processing device according to claim 1, further comprising:

a memory configured to preliminarily store a graph that expresses a plurality of relationships of proximity variation corresponding to a plurality of values of an opening/closing angle, wherein the control unit determines the relative angle by pattern-matching the extracted proximity variation component to a pattern from the stored graph.

16. The information processing device according to claim 1, wherein the information processing device does not utilize a dedicated angle-detection sensor for detecting the relative angle.

* * * * *